(No Model.)
H. C. PRATT.
CORN PLANTER AND MARKER.
No. 274,027. Patented Mar. 13, 1883.
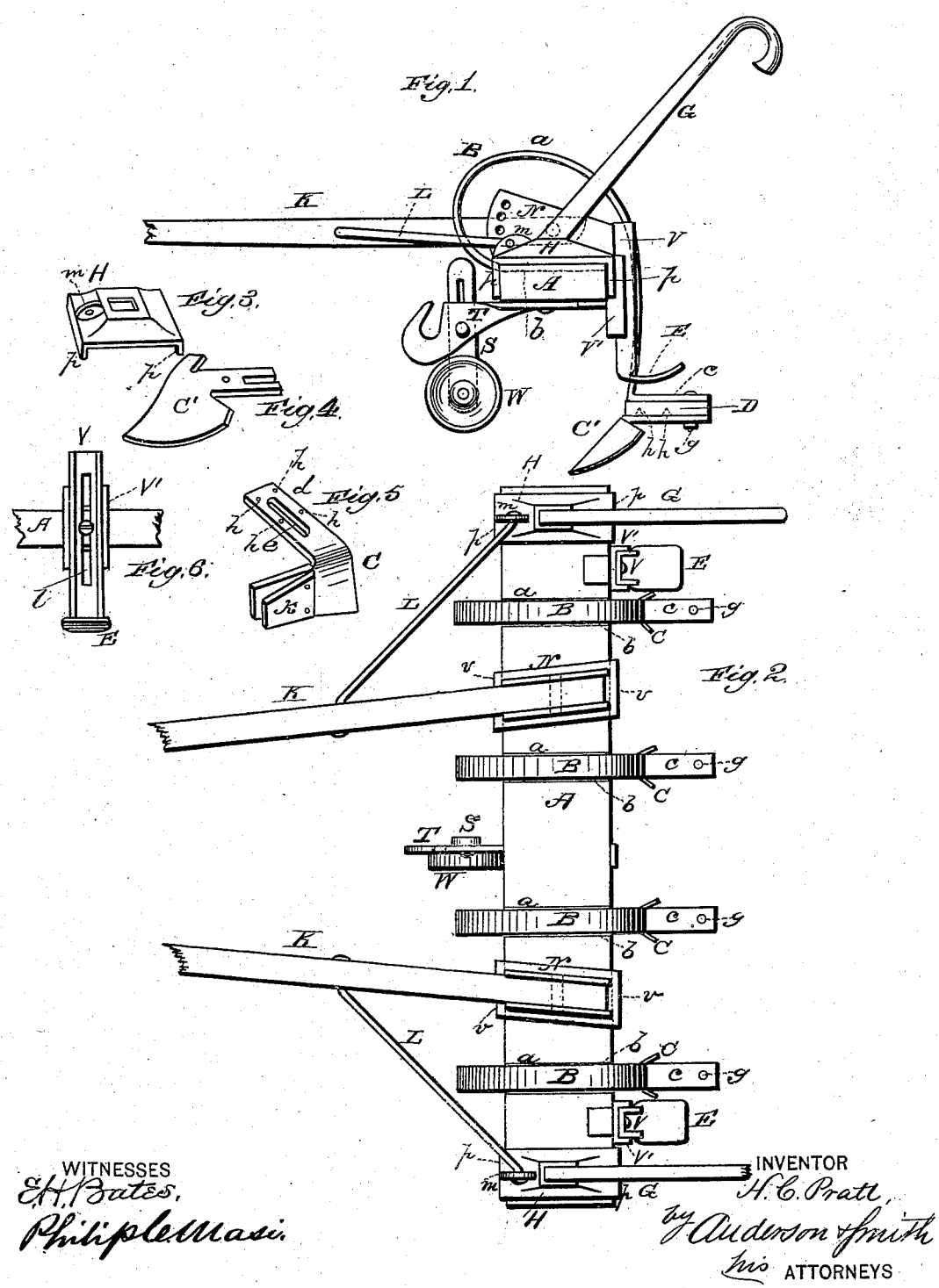

UNITED STATES PATENT OFFICE.

HENRY C. PRATT, OF CANANDAIGUA, NEW YORK.

CORN PLANTER AND MARKER.

SPECIFICATION forming part of Letters Patent No. 274,027, dated March 13, 1883.

Application filed January 4, 1883. (No model.)

*To all whom it may concern:*

Be it known that I, HENRY C. PRATT, a citizen of the United States, resident at Canandaigua, in the county of Ontario and State of New York, have invented certain new and useful Improvements in Corn Planters and Markers; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a side view of my device. Fig. 2 is a top or plan view of the same, and Figs. 3, 4, 5, and 6 are detail views.

This invention has relation to implements for marking ground preparatory to planting; and it consists in the construction and novel arrangement of devices, as hereinafter set forth, and particularly pointed out in the claims appended.

In the annexed drawings, the letter A designates a transverse frame-bar, to which the thills and handles and the spring-standards for the marking-teeth are attached.

B B indicate the spring-standards, usually four in number. The upper portion of each standard is made in scroll form, as indicated at $a$, its front end extending rearwardly and being in a channeled seat or bearing, $b$, of the frame-bar. The rear portion of the spring-standard extends downward in rear of the bar A, terminating in a rearwardly-extended foot, $c$, to which the marking-tooth or pair of teeth is attached.

C C indicate the teeth designed for marking the ground for corn-planting. These are attached to the feet of the standards in pairs. The tooth is provided with a horizontal shank, $d$, which is slotted, as indicated at $e$, to receive the fastening-bolt $g$. A piece of wood or soft material (wood being preferred) is interposed between the shank and the foot of the spring, as indicated at D, and the shank of the tooth is provided on its upper surface with projections $h$, designed to enter the wood and hold the tooth to its adjustment. The blade of the tooth extends downward at right angles to the shank, and it is provided with a wing, $k$, extending obliquely outward and rearward. In marking the ground for planting potatoes a single tooth, C', is attached to the foot of the spring-standard. This tooth is also provided with a horizontal shank, and is formed with wings on each side, as shown in the drawings. By the use of the two teeth C C a guide is made for plowing by throwing the earth into a little ridge, two little furrows being formed on each side of it. These teeth are so arranged that by turning them at right angles to the spring-foot they will throw the earth in opposite directions; or by setting them at a less angle they will leave two little furrows only. Their slots provide means whereby they may be adjusted at any desired distance apart. These teeth may be made of steel; but cast-iron is preferred. The depth at which the teeth run in the ground is regulated by the guides V, which are arranged near the ends of the frame, between the middle and outside teeth. The guide V is adjustable in a bearing, V', and is provided with a broad shoe, E, which prevents it from sinking in the soil. The guide V is slotted at $l$, and both guard and bearing are secured to the frame by a bolt. The springs are designed to have an elastic yielding action, so that the teeth will bear on the ground at all times, whether it be uneven or level, and when they come in contact with any obstruction they will move backward and upward, passing over the same without breaking or injuring any portion of the machine. These teeth are each usually fastened to the frame by one bolt, so as to facilitate a change of position when a readjustment is required, as they are designed to be placed at different distances apart, according to the work to be done. The form of the spring standard may be changed without altering the principle of this invention.

It is important to have the handles near the ends of the frame, in order to enable the driver, while controlling the movement of the implement, to keep in line by following the last mark made. At the end of the frame the handle G is inserted in a casting, H, which is bolted to the frame; or the handle may be bolted to the thill K, and braced by means of suitable rods extending from the handle to the frame-bar. When the casting H is employed it is provided with a bearing, m, for the end of a brace, L, which extends to the thill. This casting is usually provided with end flanges p, and is designed to clasp the frame-bar at its end, serving to prevent it from splitting. The thills K may be rigidly secured to the frame-bar; but they are preferably seated in bearings N, which are secured to the frame. These bearings have parallel walls, perforated for the passage of transverse bolts, whereby the thill ends are connected to said bearings.

W represents a front supporting-wheel, which is pivoted to a vertically-adjustable standard, S, which is connected to an arm, T, extending forward from the frame-bar. When this supporting-wheel is employed the thill may work upon pivot-bolts running freely up and down. When the wheel is not in use each thill should be rigidly connected to its bearing by inserting a second bolt through the bearing and thill end. The adjusting-perforations in the thill end and bearing are designed to enable the thill to be adjusted to suit the height of the horse and to change the pitch of the teeth. The bearing N is designed to be cast in a solid piece, and is provided with end flanges v, designed to clasp the frame-bar on its front and rear edges, strengthening the same.

Having described this invention, what I claim, and desire to secure by Letters Patent, is—

1. The marking implement consisting of the transverse frame-bar having the bearings b, the spring-standards B, having the feet C, the marking-teeth having the horizontal shanks d, attached to said feet, the end handles, G, the adjustable guides V, and the thills K, substantially as specified.

2. The marking-teeth having the slotted horizontal shank d, designed to be bolted to the spring-standard, and the blade C at right angles to said arm, and provided with the oblique rearwardly and outwardly turned wing k, substantially as specified.

3. The handle-bearing consisting of the casting H, having end flanges p to clasp the frame-bar, and a bearing, m, for the end of the thill-brace, substantially as specified.

In testimony whereof I affix my signature in presence of two witnesses.

HENRY C. PRATT.

Witnesses:
A. C. PRATT,
J. R. PRATT.